United States Patent
Slassi et al.

(10) Patent No.: US 12,079,059 B2
(45) Date of Patent: Sep. 3, 2024

(54) TOUCH DISPLAY POWER MANAGEMENT IN A MULTI-DISPLAY DEVICE

(71) Applicant: Microsoft Technology Licensing, LLC, Redmond, WA (US)

(72) Inventors: Matan Slassi, Herzliya (IL); Lior Zagiel, Tel-Aviv (IL); Assaf Cohen, Modi'in (IL); Netanel Hadad, Petah Tikva (IL); Liran Biber, Kfar Saba (IL); Nadav Shlomo Ben-Amram, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/473,494

(22) Filed: Sep. 25, 2023

(65) Prior Publication Data

US 2024/0012465 A1     Jan. 11, 2024

Related U.S. Application Data

(63) Continuation of application No. 17/740,566, filed on May 10, 2022, now Pat. No. 11,809,259.

(51) Int. Cl.
*G06F 1/3234* (2019.01)
*G06F 3/041* (2006.01)
*G06F 3/14* (2006.01)

(52) U.S. Cl.
CPC .......... *G06F 1/3265* (2013.01); *G06F 3/0416* (2013.01); *G06F 3/1446* (2013.01)

(58) Field of Classification Search
None
See application file for complete search history.

(56) References Cited

U.S. PATENT DOCUMENTS

| | | | |
|---|---|---|---|
| 7,331,380 B2 | 2/2008 | Ghosh et al. | |
| 8,898,398 B2 | 11/2014 | Izadi et al. | |
| 9,223,535 B2 | 12/2015 | Teltz | |
| 10,345,953 B2 | 7/2019 | Knepper et al. | |
| 10,943,557 B2 | 3/2021 | Bi et al. | |
| 10,957,018 B2 | 3/2021 | Kang et al. | |
| 2015/0130725 A1* | 5/2015 | Knepper | G06F 3/017 345/173 |

FOREIGN PATENT DOCUMENTS

| | | |
|---|---|---|
| EP | 3699738 A1 | 8/2020 |
| GB | 2544333 A | 5/2017 |

OTHER PUBLICATIONS

Hyunwoo, et al., "Output-Oriented Power Saving Mode for Mobile Devices", In Journal of Future Generation Computer Systems, vol. 72, Jul. 2017, pp. 49-64.

* cited by examiner

*Primary Examiner* — Stephen T. Reed
(74) *Attorney, Agent, or Firm* — Holzer Patel Drennan

(57) ABSTRACT

Power management logic of a multi-display touch device provides for selectively reducing a power state of a touch system within each individual display at times when the touch system of the display is inactive. The power management logic facilitates selective toggling of the touch system from a high power state to a low power state independent of a power state of other touch systems in the multi-display device, The power management logic further facilitates selective toggling of the touch system power state from the low power state to the high power state responsive to a communication received across the interlink.

20 Claims, 6 Drawing Sheets

TOUCH DISPLAY POWER MANAGEMENT IN A MULTI-DISPLAY DEVICE

CROSS-REFERENCE TO RELATED APPLICATIONS

The present application is a Continuation of and claims benefit of priority to U.S. patent application Ser. No. 17/740,566, filed May 10, 2022, and entitled "TOUCH DISPLAY POWER MANAGEMENT IN A MULTI-DISPLAY DEVICE", which is specifically incorporated by reference for all that it discloses and teaches.

BACKGROUND

Display operation is power intensive, particularly when touch sensing is supported. As such, multi-display touch devices present unique power challenges. While designs that reduce power consumption are generally favorable across the electronics industry, this is especially true for mobile devices with limited battery lives.

SUMMARY

The described technology includes power management logic that reduces battery consumption in a multi-display touch device. The power management logic is separately executed by a first touch controller within a first display and by a second touch controller within a second display. The power management logic provides for operating a touch system in each display to selectively toggle the touch system in the display from a high power state to a low power state independent of a power state of the touch system in the other display, and to selectively toggle the power state of the touch system in the display from the low power state to the high power state responsive to a communication received across the interlink.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
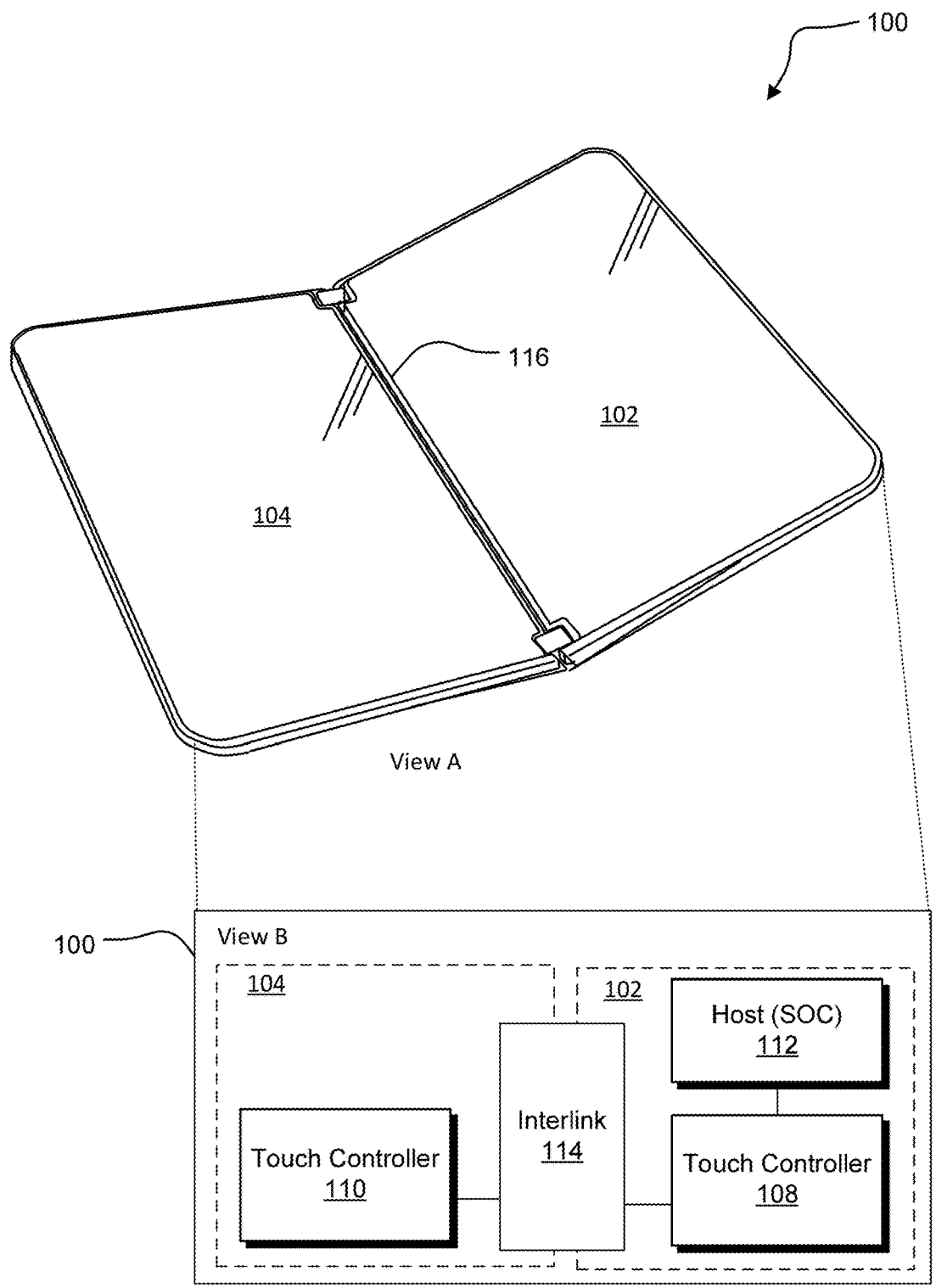
FIG. 1 illustrates an example multi-display device that supports selectable operation of touch system hardware within different displays in the same or different power states.

In a mobile device, a significant portion of battery resources are used to support display operation and touch sensing. Some newer mobile devices entering the market have multiple touch screens. These designs present significant challenges in terms of power management and battery life longevity. Some of these multi-display products are designed to support user modes where the user may selectively interact with a single display. In these scenarios, significant power savings could be realized by implementing a hardware and logic infrastructure that permits the display that not in use to be operated in a different, lower power state than the display that is in use. For example, the lower power state may save power by disabling certain features such as touch sensors and/or by slowing the clock rate of the display.

The herein disclosed technology provides a control architecture and power management system that collectively enable the concurrent operation of different displays in different power states within a multi-display device. This disclosed control architecture includes multiple touch controllers that independently implement power management logic in different displays of a multi-display device. Notably, concurrent operations of displays in different power modes presents a number of challenges relating to display responsiveness, such as how to achieve smooth tracking between delays and mitigate power mode transition times. These challenges are uniquely addressed by the herein disclosed power management logic, which supports touch controller operation in each of a controller-unified power mode and a controller-independent power mode, each of which can provide for selective toggling of the associated touch controller between a high power state and a low power state.

In the controller-unified power mode, the user is provided with the experience of interacting with one large screen spanning the different displays instead of two separate screens (e.g., a left-most portion of the screen appearing on a left-most display and a right-most portion of the display appearing on a right-most display). Activities for both touch systems are managed according to a common activity cycle. During active times within the activity cycle, the touch system is operated in a high power state supports full display functionality and high performance cross-display tracking.

In the controller-independent power mode, the user is provided with the experience of two independent display screens rather than a unified single-screen experience. In this mode, the touch systems of the two displays may be managed according to different activity cycles and operated in different power states for periods of time spanning several minutes or longer. Routine operation of the controller-independent mode may, for example, provide for operating the touch system of one display in a high power state (e.g., with all functionalities enabled) while concurrently operating the touch system of another display in a low power state in which touch sensing is disabled. Notably, the low power state still supports cross-controller (display-to-display) communications.

According to one implementation, the disclosed power management logic provides for operating an associated display touch system in a high power state whenever the associated touch controller is active and for reducing the power state of the display touch system at times when the touch controller is inactive and expected to remain in inactive for a long enough time to support power state toggling (e.g., down, and then up again in time for the next scheduled activity). As used herein, a touch controller is said to be "active" when performing events, such as events to scan for or process user inputs or events to process other received communications. A touch controller is, in contrast, "inactive" when turned on but not performing any processing actions, such as during idle periods within each clock cycle when there are no scans being performed or inputs being processed. At times when the touch controller is not receiving power, it is said to be "off," which is different from "inactive" as defined above. Examples of active and inactive times are discussed in greater detail with respect to FIG. 4.

In one implementation, the low power state is driven by a slower clock cycle than the high power state to save power. In at least one implementation, touch sensing is disabled in the low power state but the display remains illuminated. At times when a display is in the high power state but becomes inactive, the associated touch controller may selectively lower the clock rate of the associated display and may also disable certain features, such as the touch sensing hardware, to save power. The low power state still supports communications with the other display(s) in the device. When a communication is received at a touch controller operating in the low power state from a touch controller in a high power state, the display in the low power state is immediately transitioned to the high power state.

In one implementation, the above-described power state transition from the low power state to the high power state entails altering a clock rate of the display in the low power state to match the clock rate of the display in the high power state. Selectively lowering a power state of one display independent of the other at inactive times saves significant power resources. At the same time, the operation of the clock cycles at the higher rate in the high power mode ensures messages are not dropped whenever the displays are communicating with one another.

In one implementation, the multiple displays may be powered "off" and powered "on" in unison when operating in the controller-unified power mode; however, power state transitions in the controller-independent power mode are limited to those power states that support cross-display communications (e.g., from low power mode to high power mode and vice versa but not into or out of the "off" state). This feature ensures an acceptably fast response time, as it is much quicker to transition a device from the low power state to the high power state than it is to transition in and out of an "off" state. These and other benefits may be realized from the following figures.

FIG. 1 illustrates an example multi-display device 100 that supports selectable operation of touch system hardware within different displays 102 and 104 in the same or different power states. Although the multi-display device 100 includes two displays, it may be appreciated that the herein disclosed power management technique are extendible to multi-display systems with three or more displays without substantial modification. In FIG. 1, the multi-display device 100 is a mobile device, such as the size of a tablet or a mobile phone. The displays 102 and 104 are connected to one another by a hinge 116 and adapted to pivot relative to one another about the hinge. In one implementation, the hinge 116 permits the user to rotate the displays 102 and 104 through a full range of relative angles such that that the two displays 102 and 104 can be parallel and stacked on top of one another or at any position up to 180 degrees apart. In other implementations, the displays of the multi-display device 100 do not rotate relative to one another.

View B of FIG. 1 illustrates an exemplary hardware architecture of the multi-display device 100. Specifically, each of the two displays 102 and 104 includes an associated touch controller 108 and 110, respectively. The touch controllers 108 and 110 control power to touch sensing hardware (e.g., pen or finger touch inputs), such as a digitizer, capacitive sensors, or other touch-sense technology and execute processing logic for detecting and processing touch inputs and for conveying sensed touch inputs to a host 112. The host 112 may likewise transmit communications to either of the touch controllers 108 and 110, such as messages to initiate firmware actions for noise reduction in the sensed data.

The host 112 may be a system-on-chip (Soc) as shown, an application-specific integrated circuit (ASIC), central processing unit (CPU), or other processing system. In FIG. 1, the host 112 is shown integrated within (e.g., internal to the device casing of) the display 102. However, in other implementations, the host 112 may be at a location that is external to the displays 102 and 104.

In FIG. 1, the host 112 is shown directly coupled to the touch controller 108 of the display 102 but is indirectly coupled to the touch controller 110 within the display 104. As used herein "direct coupling" refers to a coupling that is between two processing endpoints without going through an intermediary processing entity. In contrast, an "indirect coupling" implies a coupling that is between two processors with a third processor in between, acting as an intermediary. In FIG. 1, the touch controller 110 is indirectly coupled to the host 112 in that it communicates with the host 112 through the touch controller 108 rather than through an independent communication channel bypassing the touch controller 108. In other implementations, the various displays may assume any physical arrangement relative to one another and the system host.

An interlink 114 provides an electrical interface that supports bidirectional communications between the touch controllers 106 and 108. According to one implementation, each of the touch controllers 108 and 110 implements identical power management logic that provides for operating the associated display touch system in either (1) a controller-independent power mode or (2) a controller-unified power mode.

In the controller-unified power mode, a same virtual screen may be presented across the first display 102 and the second display 104, giving the user the "feel" of interacting with a single large screen rather than two separate screens. In one implementation, the touch controllers 106 and 108 perform pre-scheduled processing activities according to a same, pre-selected activity cycle when operating in the controller-unified power mode. One example of a touch controller activity cycle is given by FIG. 4 herein, which illustrates various activities such as "pen search" (searching for pen input) "touch search" (searching for finger-touch input).

The two displays 102 and 104 are said to be in the controller-unified power mode whenever the two touch controllers 106 and 108 are performing processing activities according to the same activity cycle and presenting data across the two displays 102 and 104 in a unified manner that gives the user the feel of interacting with a single screen.

In contrast, the touch systems of the two displays 102 and 104 are said to be in the controller-independent power mode whenever the touch controllers 106 and 108 are concurrently operating according to different activity cycles and presenting data on the two displays 102, 104 that resembles two different screens (e.g., the user has the feel of interacting with two different screens). Transitions between the controller-unified power state and the controller-independent power state may occur responsive to detection of the device in in a certain physical orientation or responsive to user inputs (e.g., button push).

In either the controller-unified power mode or the controller-independent power mode, a touch controller (106 or 108) may selectively toggle the associated touch system between a low power state and a high power state. The low power state differs from the high power state in that certain display functionality is disabled to save power. While the touch system is not completely off (e.g., aspects of the touch system IC chip are still powered and the display is still illuminated), features such as touch sensing may be disabled.

In the controller-unified mode, the two touch systems may be maintained jointly in the high power state a vast majority of the time. In some implementations, a touch controller operating in the unified-power mode may be permitted to independently drop the power state of its associated touch system from the high power state to the low power state for brief (e.g., sub-second) idle windows within the common activity cycle shared by both touch systems. This concept is discussed with respect to FIG. 4.

When operating in the controller-independent power mode, the two touch controllers 106 and 108 concurrently implement different activity cycles and may independently reduce the power state of the associated touch system from the high power state to the low power state for more extended periods of time, such as time periods that span several activity cycles of the other touch controller that is concurrently operating in the high power state.

In one implementation, the touch controllers 108 and 110 each perform routine processing actions according to an activity cycle driven by an internal clock. A frequency of the clock is slowed in the low power state as compared to the high power state in order to save power. For example, the touch system clock may operate at 20 MHz in the high power state and at 18 MHz in the low power state. In addition to this lower clock frequency, hardware components, such as touch sensors, may also be turned off in the low power state to save additional power. Consequently, touch input sensing may be supported in the high power state but disabled in the low power state.

In both of the low power state and the high power state, communications are supported across the interlink 114 in the sense that all transmitters and receivers of the touch controllers 108 and 110 are on and capable of receiving and transmitting data.

When a message arrives across the interlink 114, it is desirable to process the message quickly to release an associated buffer (e.g., a direct memory access (DMA) buffer) so that the next incoming message can be received. However, message processing is performed more slowly in the low power state because the low power state is driven by a clock rate that is slowed as compared to the high power state. When a received message is processed too slowly and the buffer is not freed up in time to receive a next incoming message, there exists a risk that next incoming message may be dropped. In some systems, this is referred to as DMA buffer overflow.

To prevent DMA buffer overflow, all data communications between the two touch controllers 108 and 110 are, in one implementation, proceeded by an interrupt signal that may be sent in either direction. If a touch controller is not already operating in the high power state at the time that it detects an interrupt signal that has been transmitted across the interlink 114, the detection of the interrupt signal causes the touch controller to begin transitioning from the low power state to the high power state. Data communications may be transmitted between the controllers after the power state transition is partially or fully complete, e.g., pursuant to various requirements discussed below.

In one implementation, the herein disclosed power management logic is designed to ensure that the touch controllers 108, 110 do not send data messages across the interlink 114 when in the low power state and do not receive messages across the interlink 114 at times when the clock rates of the two touch controllers 106, 108 are different (e.g., when the two touch controllers 106, 108 are operating in different power states). According to one implementation, sending a data message across the interlink 114 entails a sequence of operations including (1) sending an interrupt signal across the interlink 114; (2) determining, based on the transmitted signal, what power state the receiving touch controller is operating in; (3) if the receiving touch controller is operating in the lower power state, initializing a power state transition process that includes resetting the clock of the receiving touch controller; and (4) timing transmission of the data message to ensure that receipt of the message across the interlink 114 occurs after the clock cycle of the receiving display has been reset to match that of the touch controller that transmitted the data message. Exemplary operations consistent with the above logic are presented with respect to FIG. 3.

The power management logic implemented by each the touch controllers 106, 108 provides for transitioning from the high power state to the low power state when operating in either the controller-unified mode or the controller-independent one whenever time permits—meaning, whenever the transition can be accomplished without interrupting any scheduled activities of the currently-implemented activity cycle for the given mode. For example, a touch controller operating in the high power state with a cycle repeated every may selectively transition the associated touch system into the low power state for a time period spanning an idle portion of the cycle (e.g., the last 4 ms) where no activities are scheduled to be performed by the touch controller, provided that the touch system can be transitioned back to the high power state in time for the next scheduled touch controller activity. Further examples of this are discussed with respect to FIG. 4 and FIG. 5.

Figure 2:
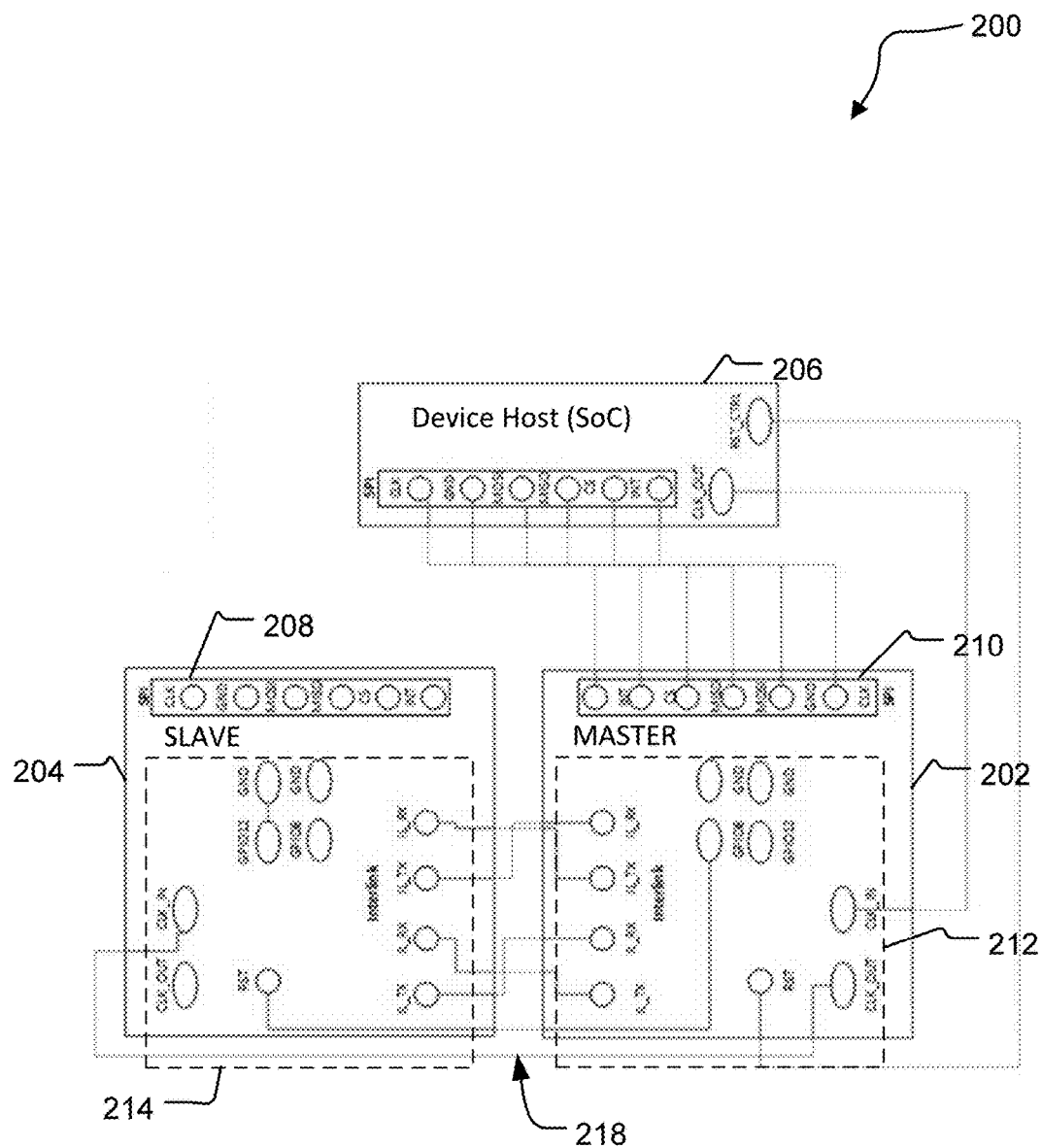
FIG. 2 illustrates architecture of an example multi-display device that supports selectable operation of touch controllers in different displays in a controller-independent power mode and in a controller-unified power mode.

FIG. 2 illustrates architecture of an example multi-display device that supports selectable operation of touch controllers in different displays in a controller-independent power mode and in a controller-unified power mode. The device 200 includes a first display 202, a second display 204, and a host 206 (e.g., an SoC or ASIC) that acts as a central processing system for the device 200. The first display 202 includes a first touch controller 212 and the second display 204 include a second touch controller 214. The first display 202 is directly coupled to the host 206 and the second display 204 is indirectly coupled to the host 206 through an interlink 218 and through the first display 202. Consequently, the first touch controller 212 effectively acts as a "master controller" while the second touch controller 214 acts as a "slave controller" in the sense that its communications to the host 206 all first past through the master device, as shown.

The touch controllers 212 and 214 may each be understood as comprising hardware and/or software components that are adapted to control hardware within an associated touch system. For example, the touch controllers 212 and 214 each include a microprocessor that executes firmware sequences to detect touch inputs from touch sensors of the associated display as well as to perform certain processing on detected touch inputs. In one implementation, the touch system of each display 202 and 204 is self-contained on an integrated circuit (e.g., an IC that includes both a touch controller and the touch system hardware that it controls).

In FIG. 2, each of the displays further includes a communication interface 208 and 210 that implements a designated network protocol to communicate with the device host 206. However, due to the master/slave arrangement of FIG. 2, the communication interface 210 is used for all host communications and the communication interface 210 is unused. The interlink 218 includes transmitters and receivers. Although not shown, the touch controllers 212, 214 may each include memory (e.g., buffers) for temporary data storage.

According to one implementation, the touch controllers 212 and 214 execute power management logic to independently operate their respective hardware in two different selectable power modes—a controller-unified power mode and a controller-independent power mode, both with features the same or similar to those described above with respect to FIG. 1 (e.g., full/unified screen v. split/non-unified screen). Within either of the selectable power modes, the touch controller may elect to toggle the associated touch system from a high power state or a low power state.

When both touch systems are operated in the high power state, the clocks of the touch controllers 212 and 214 operate at a same clock rate. All touch controller functionality is enabled for both displays. When one of the touch systems is selectively toggled into the low power state, its clock cycle is lowered and certain functionality, such as touch sensing, is disabled. Two different clock rates concurrently drive the associated touch controllers when the touch controllers are concurrently operating in different power states, When one of the touch controller 212 and 214 is inactive (e.g., not performing any processing operations), the touch controller may selectively and independently transition its associated touch system from high power state to the low power state. When this occurs, the touch controller independently drops its clock rate down from the higher rate to the lower rate to save power. In one implementation, the touch controllers 212 and 214 also disable touch sensors (e.g., turn off certain touch-sense hardware components) when operating in the low power state to save power. At the same time, the receivers and transmitters of the interlink 218 are all kept in the on state in the low power state to enable a faster transition back to the high power state than would be realized if the entire touch controller 212 or 214 in the low power state were instead turned off. To transition from the low power state to the high power state, the clock rate of each of the touch controllers 212 and 214 is reset to the higher frequency cycle by using a PLL stabilization process.

To conceptually illustrate the above, assume that the slave device (touch controller 214) is operating in the high power state while the master controller (touch controller 212) is operating in the low power state. In this case, touch sensing hardware is enabled for the display 204 but disabled for the display 202. When the user touches the screen of slave device (with either a stylus or finger), this triggers an event message to the host 206 to inform the host of the location of touch inputs and to allow the host 206 to convey inputs back to the display 204, such as to update what is being shown on the display 204.

If the slave controller tries to send a message to the host 206 across the interlink 218 while continuing to operate in the controller-independent power mode, there exists a risk that the message may be dropped (and lost) by the master controller operating in the low power state due to message buffer overflow that may occur when incoming messages are processed at the slower clock rate. For this reason, both touch controllers may implement logic to time the transmission of data communications in a manner that ensures messages are received across the interlink 218 exclusively at times that the receiving controller is operating according to the higher clock rate of the high power state.

As used herein, a "data communication" refers to a communication with multiple bits or data packets encoding data. In one implementation, a touch controller sends an interrupt signal across the interlink 218 prior to each data communication. Receipt of the interrupt signal at the other touch controller causes the receiving touch controller to initiate a clock rate transition from the slower clock rate of the low power state to a higher clock rate of the high power state (unless the receiving controller is already operating at the higher clock rate). Although the interrupt signal is a type of communication, it is different than the "data communication" defined above in that is not a multi-bit communication. In one implementation, the interrupt is a signal state change transmitted by flipping the polarity of a signal that transmitted across the interlink 218.

For example, both of the touch controllers 212, 214 may listen to an inter-link change HW state and, when this state changes, this is interpreted as an "interrupt" that may initiate a power state change transition if the device detecting the interrupt is operating in the low power state. If the receiving touch controller (in the above example, the master) detects the interrupt while operating in the high power state, no power transition is necessary to ensure that the soon-to-be-transmitted data communication will not be dropped. If, however, the receiving touch controller detects the interrupt while operating in the low power state, the receiving touch controller immediately initiates a sequence of actions—beginning with a clock reset—to self-transition from the low power state to the high power state.

The touch controller preparing to send a data communication across the interlink 218 implements logic to time the transmission of the data communication so as to ensure that the other touch controller has time, following receipt of the interrupt, to transition to the faster clock rate before the data communication is received. For example, the transmission can performed at the earliest possible transmission time for which it can be assured that receipt of the data communication will occur after the clock reset on the other touch controller.

The example described above pertains to the scenario where the slave controller is trying to send a data communication to the host through the master controller. However, identical or similar logic may likewise be implemented in the reverse scenario where the master controller is trying to send a data communication to the slave controller. For instance, the master controller may, prior to sending a data communication across the interlink 218, transmit an interrupt across the interlink 218. If the slave device touch system is operating in the low power state when it receives the interrupt, the touch controller of the slave device immediately begins to transition to the high power state—beginning with the clock reset. The data communication is transmitted at the earliest possible time for which it can be guaranteed that receipt of the data communication occurs after the clock reset is completed.

Figure 3:
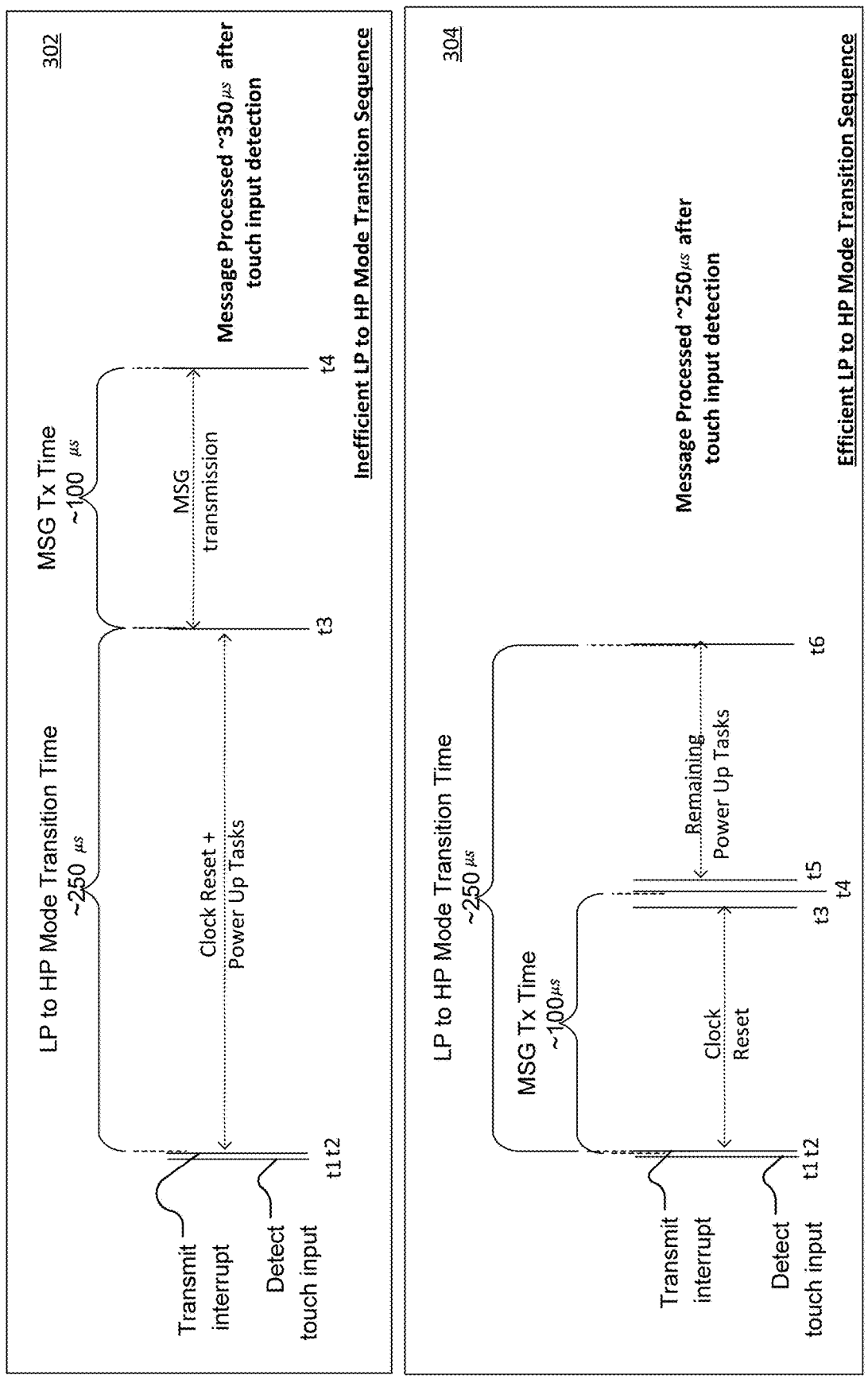
FIG. 3 illustrates first and second exemplary action sequences that may be implemented by a power management system to support communications between touch controllers in a multi-display device that supports selectable operation of touch controllers in either a controller-unified power mode or a controller-independent power mode.

A more complete sequence of operations illustrating the above is described and shown with respect to FIG. 3.

FIG. 3 illustrates first and second exemplary action sequences 302 and 304 that may be implemented by a power management system to support communications between touch controllers in a multi-display device that supports selectable operation of touch controllers in either a controller-unified power mode or a controller-independent power mode.

According to one implementation, the action sequences 302, 304 are performed in a dual-display device that has features consistent with those described above with respect to either of FIG. 1 or 2. The action sequences 302, 304 represent different sequences of actions that may be performed (in the alternative) each time a data communication ("MSG" in the figure) is transmitted from a touch controller operating in a high power state to a touch controller operating in a low power state.

The two example sequences different in that the action sequence 302 is less efficient than the action sequence 304 and is shown primarily to help illustrate key communication challenges that arise when independent touch controllers are concurrently driven by different clock rates. The action sequence 304, in contrast, illustrates an alternative way of accomplishing the same operations shown with respect to the action sequence 302 that improves device performance by decreasing perceivable lag time between the provisioning of user inputs to a display and the corresponding response of that display (e.g., display update).

In the device corresponding to the example of FIG. 3, touch inputs are detectable in a high power state but not in a low power state. The disabling of touch sensors and associated circuitry when operating in the low power state (e.g., at inactive times) saves significant device power. When operating in the high power state, the touch controllers are driven according to a higher clock rate that a clock rate that is used to drive the low power state. Both of the exemplary action sequences 302, 304 correspond to the scenario where a data communication is to be transmitted from a touch controller operating in the high power state to a touch controller that is operating in a low power state. To ensure that the communication is not dropped, actions are taken reset the clock rate of the touch controller in the low power state before the communication arrives.

The action sequence 302 is initiated at a time t1 when a first touch controller detects an event triggering the transmission of a data communication across the interlink to a second touch controller. For example, the first touch controller may detect a touch input that triggers transmission of select information to a device host that is to pass through the second touch controller in route to the host (e.g., as in the master/slave architecture of FIG. 2). Alternatively, the first touch controller may detect another type of event that triggers transmission of a message to the other touch controller, such as a hardware error that triggers transmission of a debug message.

Responsive to detecting the event triggering the communication, the first touch controller transmits an interrupt signal at t2. In one implementation, the interrupt signal is an inter-link change hardware state that the second controller is listening to across the interlink. The interrupt signal is an effective way for one touch controller to "signal" to the other because (as described elsewhere herein) data communications may be dropped when the two touch systems are operating in different power modes. The interrupt signal therefore serves the purpose of a data communication but is transmitted more quickly and without risk of being dropped.

The second touch controller detects the interrupt while operating in the low power state and immediately self-initiates a process for transitioning from the low power state to the high power state. This transition includes operations that include powering on touch sensors and associated circuitry as well as resetting the clock rate of the first touch controller to match and be synchronized with the higher clock rate of the second touch controller. This transition from the lower power state to the higher power state may span a considerably lengthy time interval that is on the order of 250 µs, as shown between t2 and t3.

Once the power state transition is complete (at t3), the first touch controller sends the data communication across the interlink to the second touch controller. The time between transmission (at t3) and receipt (at t4) of the data communication spans another considerably lengthy time interval, such as 100 µs. By the time the second controller receives the data communication, over 350 µs have elapsed. This significant elapsed time translates to lag time that may be perceived by a user, such as when the user provides a touch input and waits for the display to update in response.

The action sequence 304 presents an alternative and more efficient order for the operations described above. At a time t1, the first touch controller detects an event triggering the transmission of a data communication across the interlink (e.g., a message to the SoC or to the other data controller) and transmits an interrupt. At t2, the second touch controller detects the interrupt while operating in the low power state and immediately begins the process of transitioning from the low power state to the high power state.

The operations in the action sequence 304 differ from those described above with respect to prioritization of tasks performed as part of the transition from the low power state to the high power state. In the action sequence 304, the touch controller splits the power state transition into two temporal components including a first subset of tasks performed prior to transmission of the message (e.g., between t3 and t4) and a second subset of tasks performed after transmission of the message (e.g., between t5 and t6). As described below, the splitting of these tasks in this manner effectively allows the data communication to be transmitted earlier—and without a risk of being dropped—than in the above-described scenario pertaining to the action sequence 302. Quicker transmission of the data communication translates to a reduction in device responsive times that may be apparent to an end user.

When the interrupt is detected by the second touch controller, the second touch controller begins the first subset of operations by initializing a PLL stabilization process. The PLL stabilization is effective to reset the clock of the second touch controller to match the higher clock rate of the first touch controller. This PLL stabilization process can be completed within a predefined time interval that is, in the illustrated example, ~70 µs. In the action sequence 304, the data communication is transmitted across the interlink by the first touch controller at the "earliest possible time"—meaning, the earliest time at which it can be assured that the arrival of the communication at the second controller is timed to be after the completion of the PLL stabilization (after t3) and preferably, as close in temporal proximity to the completion of the PLL stabilization as possible.

In the device corresponding to the example of FIG. 3, transmission of the data communication takes just longer than the PLL stabilization process. In this case, the data communication transmission spans ~80 µs whereas the PLL rest takes 70 µs. Consequently, the data communication can be transmitted at the same time that the PLL stabilization is started (t2), and it can be assured message arrival occurs after the PLL stabilization is complete. In other implementations, the data communication may be sent earlier or later provided that the data communication is still received after completion of the PLL stabilization and timed to be as close in time as possible following completion of the PLL stabilization process.

Once the PLL stabilization is complete (e.g., at t3), the clocks on the two touch controllers are again operating at the faster clock rate, which ensures that the data communication is not dropped. The PLL stabilization completes at t3, and the data communication arrives at t4. When the data communication is received at t4, message processing takes priority and the second controller temporarily halts all processing activities. This effectively postpones a subset of remaining power state transition tasks until after the data communication is placed into a storage buffer. When the data communication is safely in the buffer the touch controller can, at t5, resume the postponed power state transition tasks and thereby finish transitioning the touch system of the second display to the high power state. Once all power state transition tasks are completed (e.g., at t6) the second touch controller may then retrieve the stored communication from the buffer and process the communication.

When the second touch controller is finally ready to process the received communication (at t6), approximately 250 µs have elapsed since the transmission of the interrupt signal. Therefore, the operations of the action sequence 304 are completed about 100 µs quicker than the operations of the action sequence 302. The translates to higher device responsiveness and a much lower likelihood of the user noticing lag times associated with provisioning of touch inputs.

Figure 4:
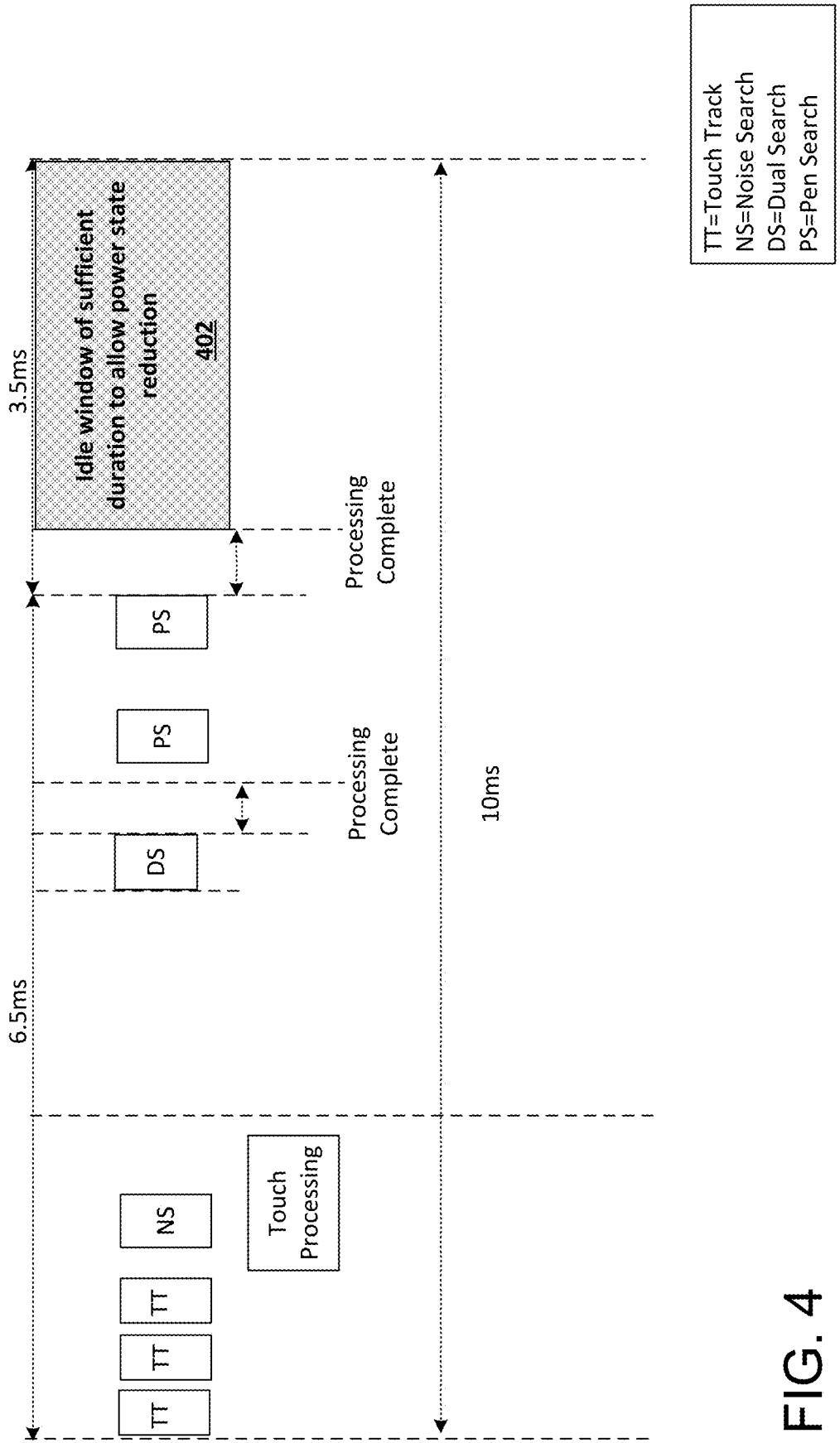
FIG. 4 illustrates an example cycle of processing operations for a touch controller in a multi-display touch device implementing the herein disclosed touch system power management logic.

FIG. 4 illustrates an example cycle 400 of processing operations that may be implemented by a touch controller in a multi-display implementing the herein disclosed touch system power management logic. The cycle 400 provides one example schedule of processing activities that may be cyclically-executed within a set interval (e.g., 10 ms) by an associated touch controller such as any of the individual touch controllers discussed with respect to FIG. 1-3. For example, each touch controller of the various multi-display devices disclosed herein may execute its own respective processing activities according to a cycle similar in concept to that shown in FIG. 4.

The cycle 400 may be understood as driving activities of the corresponding touch controller and being repeatedly executed (in a loop) until such time that the touch controller is powered off or until the cycle 400 is swapped for another stored cycle. For example, each touch controller may have access to multiple different cycles stored in firmware and selectively alternate which of the stored cycles is followed at different times based on various factors such as the types of inputs being provided by a user, the amount of reserve battery power remaining, the identities and characteristics of other active processes on the multi-display device, etc.

The cycle 400 is 10 ms in length and provides for performing a number of processing activities in a high power state. Various activities included in the cycle include Touch Track (TT, a scan to detect finger-touch inputs); noise search (NS, a calibration to detect noise that may be subtracted from detected touch signals); Dual Search (DS, an activity that searches for finger-touch and pen inputs simultaneously); Pen Search (PS, an activity that searches for pen input); and Touch Processing (an activity that provides for processing detected touch inputs before transmitting related data to a host).

As explained with respect to other figures herein, the touch controller may be configured to selectively toggle between a low power state that does not support touch sensing (e.g., touch sensing hardware is powered off) and a high power state that does support touch sensing. In one implementation, all of the exemplary activities shown in the cycle 400 can be performed in the high power mode but not in the low power state.

When all touch controllers in the device are implementing a same activity cycle, such as the cycle 400, the touch controllers are said to be operating in a "controller-unified" mode. When the touch controllers are implementing different cycles (e.g., cycles associated with different power states and clock rates), the touch controllers are said to be operating in a "controller-independent mode."

During each repeated cycle (e.g., the cycle 400 or other alternative, selectable cycles), the touch controller identifies idle window(s) within the cycle that are large enough to facilitate a temporarily (e.g., few millisecond) reduction in the power state from the high power state to the low power state. The term "idle window" refers to windows within the processing cycle where the touch controller is not scheduled to perform any processing activities. An idle window may be large enough to support a temporary reduction in the power state when it is long enough in duration to allow the touch system to reduce the power state from high to low and to restore the high power state before the planned start time of the next cycle activity.

Assume, for example, it takes 30 microseconds to reduce from the high power state to the low power state and 250 microseconds to increase the power state from the low power state back to the high power state. In this case, an idle window of 280 microseconds is needed to support a temporary reduction in the power state. In the cycle 400, there does exist an idle window 402 that is about 3 milliseconds in duration. Since this is larger than 250 microseconds, this idle window is identified as being large enough to support a power reduction. At the start time of the idle window 402, the touch controller initiates a power state reduction event (e.g., spanning 30 microseconds). The touch controller subsequently initiates power state increase event toward the end of the idle window, such as at or near the last possible start time for which it can be assured that the power state increase events will be completed prior to the start of the next scheduled activity. For example, the touch controller may initiate the power state increase at a time that is 250 microseconds before the end of the idle window, allowing the first touch track (TT) activity in the cycle to be started performed on time.

In this way, the touch controllers in the multi-display device can independently reduce the power state of the associated touch system for short (sub-second) intervals within their respective activity cycles whenever there exists an idle window long enough to ensure the power state can be reduced and then restored without interrupting any processing activities. The net effect of these sub-second reduced-power intervals is significant over an extended period of time such as an hour or a few hours, meaningfully extending battery life.

Notably, FIG. 4 provides an example of a scenario when the different touch controllers may concurrently operate in different power states (high/low) while implementing the same prescheduled activity cycle characteristic of the unified-controller mode. This occurs when one of the two touch controllers has a larger idle window than the other (e.g., due to lack of user touch/pen inputs) that allow it to drop into the lower power state for a brief time interval within the activity cycle, as described above. In this case, the touch controllers are said to be operating in the controller-unified mode (due to the common activity cycle) even though the respective power state is different for a brief period of time.

Figure 5:
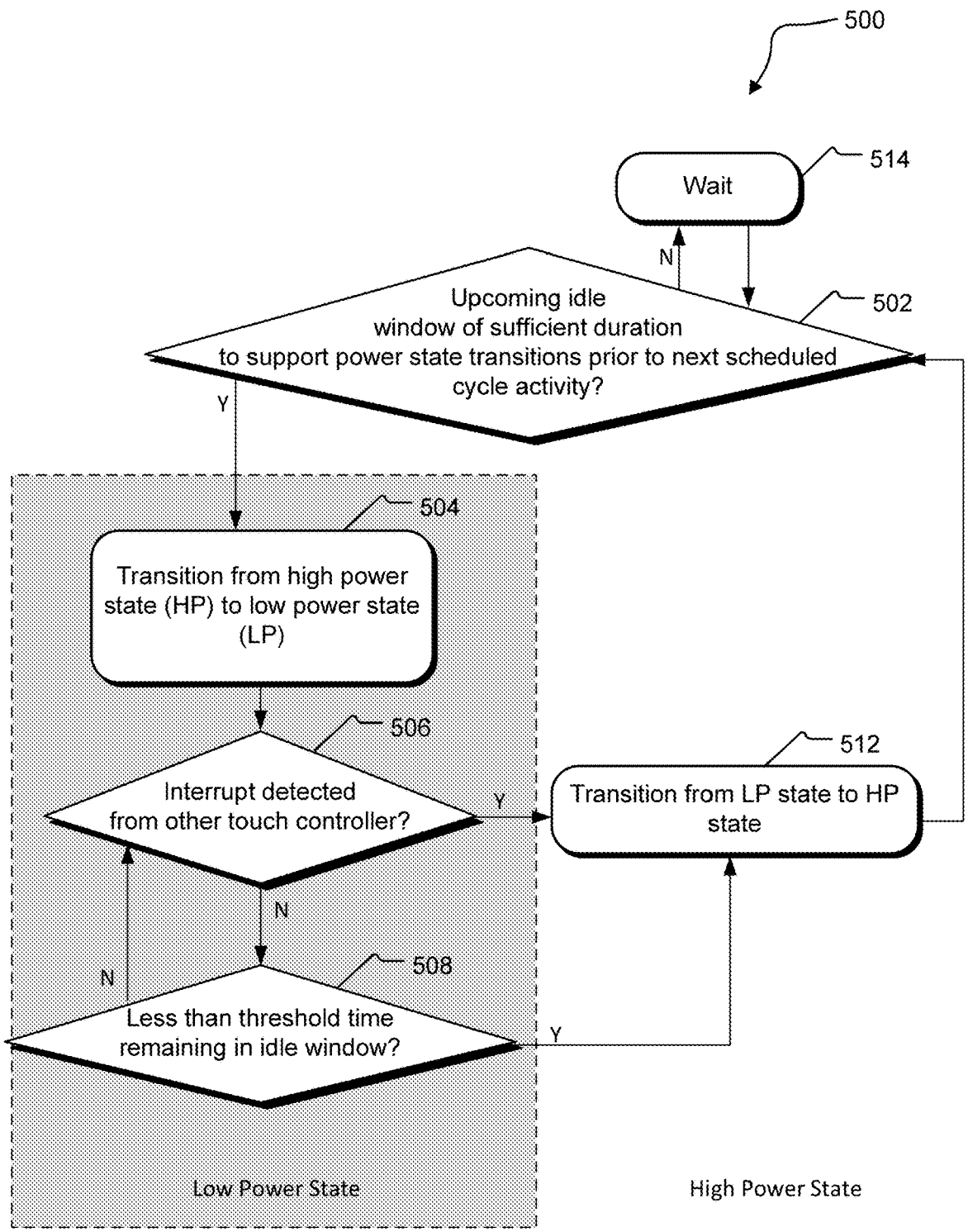
FIG. 5 illustrates a flow diagram of example power management logic operations that provide for transitioning a display touch system between power modes in a multi-display system implementing the disclosed technology.

FIG. 5 illustrates a flow diagram of example power management logic operations 500 that provide for transitioning a display touch system between power states in a multi-display system implementing the disclosed technology. The multi-display system includes a first touch display with touch sensing hardware (e.g., digitizer, capacitance sensors) managed by a first touch controller and a second touch display with touch sensing hardware managed by a second touch controller. Each of the first touch controller and the second touch controller may independently implement the power management logic operations 500 to selectively transition the associated display touch system between a high power (HP) state and a low power (LP) state independent of power transitions that may or may not be performed by the other touch controller.

Whenever both touch controllers are operating in the high power state, the internal clocks of the two controllers are operating a same, faster rate and touch sensing is enabled on both displays. Whenever one of the two touch controllers transitions from the high power state to the low power state, the controller operating at the LP state is driven by a clock rate that is lower than the clock rate driving the other controller that continues to operate in the HP state.

The operations 500 (logic executed by each of the touch controllers) provides a set of continuous and repeated checks to determine if and when power transitions may occur. Operations shown inside of the gray box 520 may be performed when the associated touch controller is operating in the LP state. Operations shown outside of the gray box 520 may be performed when the associated touch controller is operating in the HP state. Notably, the illustrated operation flow is cyclical and the operations could therefore be understood as starting at any point within the flow diagram.

Per the operations 500, the touch controller can selectively and independently reduce power of the associated touch system whenever time permits—meaning, for example, whenever there exists an idle window between planned activities of the touch controller that is large enough to support two power state transitions (from HP to LP and then back to HP).

A determination operation 502 determines whether there exists an upcoming idle window in the current activity cycle of the touch controller that is large enough to allow a temporary reduction in the touch system power state (to LP) while still allowing the touch controller to return to the HP state in time for the next scheduled activity that requires the HP state.

The "idle window" referenced in the determination operation 502 refers to a continuous window of time in which the touch controller is not scheduled to perform any activities that require the HP state (for example, touch scans may be supported by the HP state but unsupported by the LP state). If, for example, it takes 30 microseconds to transition from the HP state to the LP state and another 250 microseconds to transition back to the HP state, the determination operation 510 may determine that the idle window is of "sufficient duration" whenever the idle window is greater than 280 microseconds in duration. Provided such an idle window is identified, a transitioning operation 504 transitions the touch system from the HP state to the LP state at the start of the identified idle window.

If there are no idle windows of sufficient size to support the above described power state transitions in the current cycle (e.g., down to LP and then back again to HP within a few milliseconds), a waiting loop 514 is entered until such time that an idle window of sufficient duration is identified by the determination operation 502.

Following the transition operation 504, a detection operation 506 listens for an interrupt signal from the other touch controller. For example, the interrupt detection operation may detect the interrupt when a state change is detected on an input signal provided by the other touch controller. In one implementation, interrupt signals of this nature are transmitted by the touch controller each time the touch controller detects an event triggering a prospective data communication action to the other touch controller. Prior to sending that data communication, the touch controller sends an interrupt signal. If the touch controller receiving the interrupt signal is not currently operating in the HP state, detection of the interrupt signal may cause the touch controller to initiate a transition from the current LP state to the HP state. If an interrupt is detected at the detection operation 506, a transitioning operation 512 transitions the touch system from the LP state back to the HP state, which ensures that the touch controller is available to receive and process data communications received from the other touch controller.

Returning to the interrupt detection operation 506: if no interrupt is detected, the touch system remains in the LP state and the operations proceed to a determination operation 508, which determines whether the time remaining in the idle window is less than a defined a threshold. For example, the determination operation 508 may determine that the time remaining is greater than the threshold if the remaining idle window time exceeds (e.g., by some defined margin) the time that is required to increase the touch system power state from low to high. The threshold may be set to ensure that the remaining time in the idle window is long enough to increase the touch system power state from LP to HP without running into the next scheduled activity.

If the time remaining is greater than the threshold, the touch system may remain in the low power state while the interrupt detection operation 506 and the determination operation 508 are cyclically repeated until an interrupt is detected or a planned activity requiring the HP state is scheduled to occur within the examined future time interval.

If the determination operation 508 determines that the time remaining in the idle window is less than the threshold, a transitioning operation 512 commences and begins transitioning the touch system from the LP state to the HP state (e.g., where the internal clocks of the two touch controllers operate at the faster clock rate). After this power state transition is compete, the determination operation 502 is repeated to identify the next idle window in the activity cycle that may support a power state reduction and the other operations 500 are thereby cyclically repeated.

Figure 6:
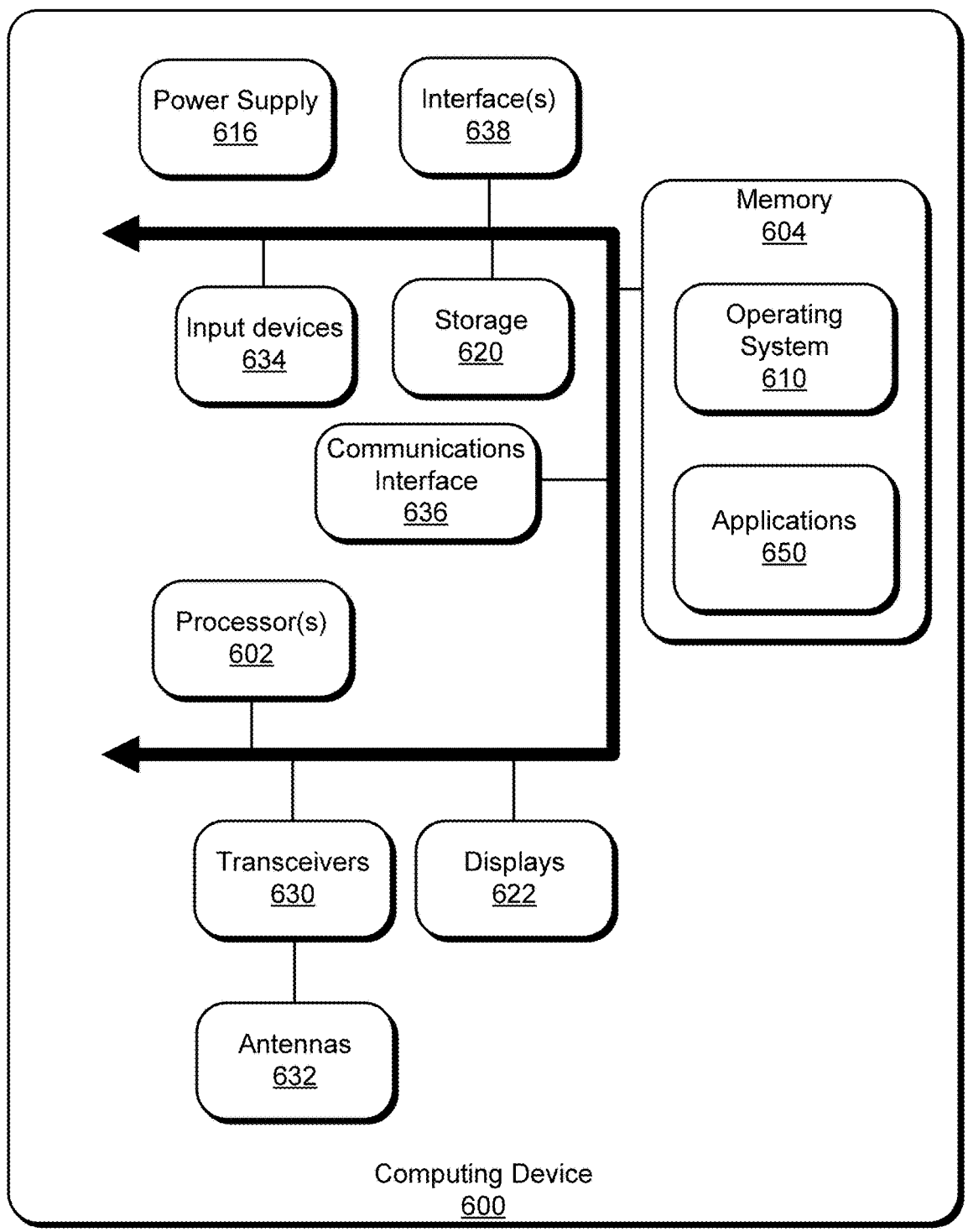
FIG. 6 illustrates an example computing device that includes multiple displays and that supports controller-independent and controller-unified power modes for touch controllers within each of the multiple displays.

FIG. 6 illustrates an example computing device 600 with multiple displays 622 that supports controller-independent and controller-unified power modes and power state independence for touch controllers within each of the multiple displays. The computing device 600 may be a client device, such as a laptop, mobile device, desktop, tablet, or a server/cloud device. The computing device 600 includes one or more processor(s) 602, and a memory 604. The memory 604 generally includes both volatile memory (e.g., RAM) and nonvolatile memory (e.g., flash memory). An operating system 610 resides in the memory 604 and is executed by the processor(s) 602.

In an example computing device 600, as shown in FIG. 6, one or more modules or segments, such as applications 650; all or part of a communication interface, touch controllers, data controllers, and other modules are loaded into the operating system 610 on the memory 604 and/or storage 620 and executed by processor(s) 602. The storage 620 may store timing data, sensor measurements, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such as that a user may enter commands and information (e.g., a keyboard or mouse). These and other input devices may be coupled to the server by one or more interfaces 638, such as a serial port interface, parallel port, or universal serial bus (USB). The computing device 600 further includes the displays 622, which are touch screen displays incorporating touch sense hardware. In one implementation the displays 622 each further include at least one microprocessor and memory storing firmware instructions for detecting and interpreting touch inputs provided to the touch sense hardware.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals (such as signals per se) and includes volatile and nonvolatile, removable, and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

According to one implementation, an example mobile device disclosed herein includes a first touch controller in a first display; a second touch controller in a second display; an interlink coupling the first touch controller to the second touch controller; and power management logic. The power management logic is separately executed by each of the first touch controller and the second touch controller and is executable to operate a touch system in each display to selectively toggle the touch system in the display from a high power state to a low power state independent of a power state of the touch system in the other display and to selectively toggle the power state of the touch system in the display from the low power state to the high power state responsive to a communication received across the interlink. The above features are beneficial because the independent management of the two touch systems allows an idle one of the two touch systems to be transitioned to a low power state to save power while the other touch system remains active.

In example mobile device according to any preceding mobile device, the touch inputs are detectable in the high power state but not in the low power state. Disabling touch sensors in the low power state allows further power savings.

In another example mobile device of any preceding mobile device, the power management logic is further executable to operate the first touch controller and the second touch controller in each of a controller-unified mode and a controller-independent mode. A same activity cycle is concurrently executed by the first touch controller and the second touch controller when operating in the controller-unified mode and different activity cycles are concurrently executed by the first touch controller and the second touch controller when operating in the controller-independent mode.

In yet still another example mobile device of any preceding mobile device, the First touch controller and the second touch controller are concurrently driven by different clock rates when the first touch controller is operating in the low power state and the second touch controller is operating in the high power state.

In still another example mobile device of any preceding mobile device, the power management logic is further executable by each touch controller of the first touch controller and the second touch controller to selectively and independently transition the associated touch system to the low power state during each idle window within a scheduled activity cycle that is large enough in duration to support a transition into and out of the low power state.

In yet still another example mobile device of any preceding mobile device, the power management logic is further executable to transmit an interrupt signal each time an event triggers transmission of a data communication between the first touch controller and the second touch controller; listen for the interrupt signal when operating in the low power state; and responsive to detection of the interrupt signal, selectively transition the touch system out of the low power state of and into the high power.

In yet still another example mobile device of any preceding mobile device, selectively transitioning the touch system further comprises dividing power state transition tasks into a first subset of tasks including a clock reset and a second subset of tasks including powering on touch sensors and prioritizing the first subset of tasks ahead of the second subset of tasks.

In another example mobile device of any preceding mobile device, the first display acts as a master device that communicates with a host by transmitting data across a first interface and wherein the second display acts as a slave device that communicates with the host by transmitting data across the interlink, through the first display, and across the first interface.

In yet another aspect, some implementations include a computer-readable storage medium for storing computer-readable instructions. The computer-readable instructions, when executed by one or more hardware processors, perform power management operations in a dual display device consistent with any of the features described herein.

In yet still another aspect, some implementations include methods for implementing power management logic in a dual display mobile. When performed, the operations of the recited methods provided the functionality of any of the computer system features described herein.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A mobile device comprising:
   a first touch controller in a first display;
   a second touch controller in a second display; and
   an interlink coupling the first touch controller to the second touch controller, the first touch controller being configured to execute power state transition operations on behalf of the first display in response to receipt of an interrupt from the second touch controller across the interlink, the power state transition operations prioritizing a first subset of tasks including a clock reset over a second subset of tasks including powering on touch sensors.

2. The mobile device of claim 1, wherein the first touch controller is further configured to:
   begin executing the first subset of tasks in response to the receipt of the interrupt;
   receive a data communication from the second touch controller following completion of the first subset of tasks;
   halt processing of the second subset of tasks in response to receipt of the data communication;
   resume the processing of the second subset of tasks after placing the data communication in a buffer; and
   process the data communication following completion of the second subset of tasks.

3. The mobile device of claim 1, wherein the second touch controller is configured to:
   detect an event triggering transmission of a data communication across the interlink; and
   in response to detection of the event, transmit the interrupt across the interlink; and
   transmit the data communication across the interlink at a time following transition of the interrupt.

4. The mobile device of claim 3, wherein the second touch controller is further configured to transmit the data communication across the interlink at a transmission time selected to guarantee receipt of the data communication after the first touch controller has received the interrupt and completed the clock reset of the first display.

5. The mobile device of claim 2, wherein the data communication is received at the first touch controller before the first touch controller has completed executing the second subset of tasks.

6. The mobile device of claim 1, wherein the power state transition operations toggle the first display from a low power state to a high power state.

7. The mobile device of claim 6, wherein the first touch controller and the second touch controller are concurrently driven by different clock rates when the first touch controller is operating in the low power state and the second touch controller is operating in the high power state.

8. The mobile device of claim 6, wherein the first touch controller is further executable to selectively and independently transition a touch system of the first display to the low power state during each idle window within a scheduled activity cycle that is large enough in duration to support a transition into and out of the low power state.

9. The mobile device of claim 1, wherein the first touch controller and the second touch controller are configured for selective operation in a controller-unified mode and a controller-independent mode, wherein a same activity cycle is concurrently executed by the first touch controller and the second touch controller when operating in the controller-unified mode and different activity cycles are concurrently executed by the first touch controller and the second touch controller when operating in the controller-independent mode.

10. One or more non-transitory computer-readable storage media encoding computable-executable instructions for executing a computer process, the computer process comprising:
    receiving, at a first touch controller, an interrupt transmitted across an interlink coupling the first touch controller to a second touch controller; and
    initiating, by the first touch controller, power state transition operations for toggling a power state of a first display from a low power state to a high power state in response to receipt of the interrupt, the power state transition operations prioritizing a first subset of tasks including a clock reset over a second subset of tasks including powering on touch sensors.

11. The one or more non-transitory computer-readable storage media of claim 10, wherein the power state transition operations further comprise:
    initiating execution of the first subset of tasks in response to the receipt of the interrupt;
    halting processing of the second subset of tasks in response to receipt of a data communication across the interlink;
    resuming the processing of the second subset of tasks after placing the data communication in a buffer; and
    processing the data communication following completion of the second subset of tasks.

12. The one or more non-transitory computer-readable storage media of claim 11, wherein the data communication is received at the first touch controller before the first touch controller has completed executing the second subset of tasks.

13. The one or more non-transitory computer-readable storage media of claim 10, wherein the power state transition operations toggle the first display from a low power state to a high power state.

14. The one or more non-transitory computer-readable storage media of claim 10, wherein the first touch controller and the second touch controller are concurrently driven by different clock rates when the first touch controller is operating in the low power state and the second touch controller is operating in the high power state.

15. The one or more non-transitory computer-readable storage media of claim 10, wherein the first touch controller is further executable to selectively and independently transition a touch system of the first display to the low power state during each idle window within a scheduled activity cycle that is large enough in duration to support a transition into and out of the low power state.

16. The one or more non-transitory computer-readable storage media of claim 10 wherein the first touch controller and the second touch controller are configured for selective operation in a controller-unified mode and a controller-independent mode, wherein a same activity cycle is concurrently executed by the first touch controller and the second touch controller when operating in the controller-unified mode and different activity cycles are concurrently executed by the first touch controller and the second touch controller when operating in the controller-independent mode.

17. A mobile device comprising:
    a master touch controller in a first display, the master touch controller being directly coupled to a host within the mobile device;
    a slave touch controller in a second display, the slave touch controller being indirectly coupled to the host through the master touch controller of the first display;
    an interlink coupling the master touch controller to the slave touch controller; and
    power management logic separately executed within each of the master touch controller and the slave touch controller, the power management logic being executable to:
        initiate power state transition operations that prioritize a first subset of tasks including a clock reset over a second subset of tasks including powering on touch sensors, the power state transition operations further comprising:
        receive a data communication across the interlink following completion of the first subset of tasks and prior to completion of the second subset of tasks;
        halt processing of the second subset of tasks in response to receipt of the data communication across the interlink;
        resume the processing of the second subset of tasks after placing the data communication in a buffer; and
        process the data communication following completion of the second subset of tasks.

18. The mobile device of claim 17, wherein the power state transition operations toggle a display power state from a low power state to a high power state, and wherein the master touch controller and the slave touch controller are concurrently driven by different clock rates when the master touch controller is operating in the low power state and the slave touch controller is operating in the high power state.

19. The mobile device of claim 17, wherein the power state transition operations are initiated in response to receipt of an interrupt across the interlink.

20. The mobile device of claim 17, wherein the master touch controller and the slave touch controller are configured for selective operation in a controller-unified mode and a controller-independent mode, wherein a same activity cycle is concurrently executed by the master touch controller and the slave touch controller when operating in the controller-unified mode and different activity cycles are concurrently executed by the master touch controller and the slave touch controller when operating in the controller-independent mode.

* * * * *